(12) United States Patent
Ree et al.

(10) Patent No.: US 8,918,578 B2
(45) Date of Patent: Dec. 23, 2014

(54) METHOD AND SYSTEM OF A TIMER BASED BUFFER USED FOR METROLOGY

(75) Inventors: Bradley Richard Ree, Cumming, GA (US); Mark Victor Penna, Wake Forest, NC (US); George William Alexander, Marietta, GA (US)

(73) Assignee: General Electric Company, Schenectady, NY (US)

( * ) Notice: Subject to any disclaimer, the term of this patent is extended or adjusted under 35 U.S.C. 154(b) by 96 days.

(21) Appl. No.: 13/196,115

(22) Filed: Aug. 2, 2011

(65) Prior Publication Data

US 2013/0036251 A1 Feb. 7, 2013

(51) Int. Cl.
*G06F 12/14* (2006.01)

(52) U.S. Cl.
USPC .................. 711/103; 711/202; 711/4; 710/26

(58) Field of Classification Search
USPC .................................. 711/103, 4, 202; 710/26
See application file for complete search history.

(56) References Cited

U.S. PATENT DOCUMENTS

| | | | |
|---|---|---|---|
| 6,069,827 A | 5/2000 | Sinclair | |
| 6,798,353 B2 | 9/2004 | Seal et al. | |
| 8,180,917 B1 * | 5/2012 | Yan et al. | 709/234 |
| 2003/0037185 A1 * | 2/2003 | Davis et al. | 710/1 |
| 2003/0201904 A1 * | 10/2003 | Seal et al. | 340/870.02 |
| 2005/0050375 A1 * | 3/2005 | Novak et al. | 713/600 |
| 2009/0138777 A1 * | 5/2009 | Veillette | 714/748 |

FOREIGN PATENT DOCUMENTS

| | | |
|---|---|---|
| CN | 101853149 A | 10/2010 |
| EP | 0540154 A1 | 5/1993 |
| JP | 62-16166 A | 1/1984 |
| WO | 0008800 A2 | 2/2000 |
| WO | 03091964 A1 | 11/2003 |

OTHER PUBLICATIONS

Office Action issued in connection with NZ Application No. 601564, Aug. 7, 2012.
Office action issued in connection with AU Patent Application No. 2012209020, Jul. 30, 2013.

* cited by examiner

*Primary Examiner* — Jae Yu
(74) *Attorney, Agent, or Firm* — Fletcher Yoder, P.C.

(57) ABSTRACT

Described herein are embodiments of methods and systems of using a timer based memory buffer for metrology. One embodiment of the method comprises receiving metrology data from one or more metrology sensors; writing at least part of the metrology data to a volatile memory; incrementing a write pointer to indicate the metrology data contained within the volatile memory; and repeating the above until a timer expires, then reading at least a portion of the metrology data from the volatile memory.

23 Claims, 6 Drawing Sheets

METHOD AND SYSTEM OF A TIMER BASED BUFFER USED FOR METROLOGY

BACKGROUND OF THE INVENTION

Generally, in revenue meters having memory, metrology data was stored in serially-erasable programmable read-only memory (SEPROM). This was done because the memory structures could be randomly accessed and written one byte at a time. Also, the processors used in these meters did not have large amounts of random access memory (RAM) available, and thus had to store the metrology data into SEPROM. Because of the low RAM of the processors and the use of SEPROM, memory management was coupled with data collection.

Therefore, systems and methods are desired that overcome challenges present in the art, some of which are described above.

BRIEF DESCRIPTION OF THE INVENTION

Described herein are embodiments of methods and systems of a timer based buffer used for metrology.

One aspect comprises a method of using a timer based memory buffer for metrology. One embodiment of the method comprises receiving metrology data from one or more metrology sensors; writing at least part of the metrology data to volatile memory buffer; incrementing a write pointer to indicate the location of the metrology data contained within the volatile memory buffer; and repeating the above until a timer expires, then reading the metrology data from the volatile memory buffer.

In another aspect, a system is described. One embodiment of the system is comprised of one or more metrology sensors; a volatile memory buffer; a non-volatile random access memory (NVRAM); a timer; and a processor, wherein the processor is operably connected with the one or more metrology sensors, the volatile memory buffer, the NVRAM and the timer, and the processor is configured to: a) receive metrology data from the one or more metrology sensors; b) write at least part of the metrology data to the volatile memory buffer; c) increment a write pointer to indicate the metrology data contained within the volatile memory buffer; and d) repeat steps a) through c), above, until the timer expires, then reading the metrology data from the volatile memory buffer.

In yet another aspect, a meter is described. One embodiment of the meter comprises one or more metrology sensors; a dynamic random access memory (DRAM); a non-volatile random access memory (NVRAM); a timer; a network interface; and a processor, wherein the processor is operably connected with the one or more metrology sensors, the DRAM, the NVRAM, the network interface, and the timer. The processor is configured to: a) receive metrology data from the one or more metrology sensors; b) write at least part of the metrology data to the DRAM; c) increment a write pointer indicating the location of the metrology data contained within the DRAM; and d) repeat steps a) through c), above, until the timer expires, then set the write pointer as a read pointer and reading at least a portion of the metrology data from the DRAM up to an amount of metrology data as indicated by the read pointer and write at least the portion of the metrology data read from the DRAM to the NVRAM.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION OF THE INVENTION

Before the present methods and systems are disclosed and described, it is to be understood that the methods and systems are not limited to specific synthetic methods, specific components, or to particular compositions. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the Examples included therein and to the Figures and their previous and following description.

Figure 1:
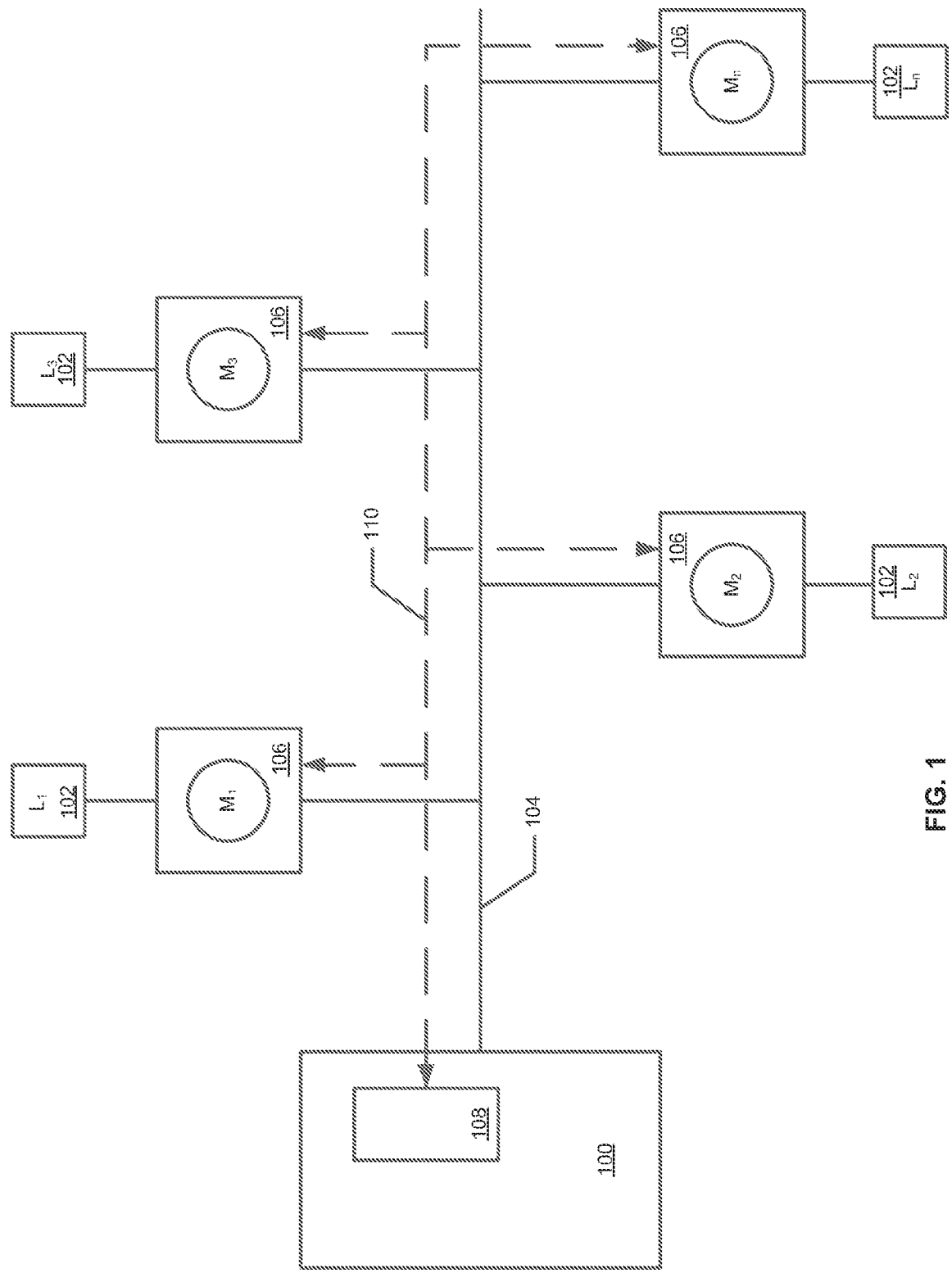
FIG. 1 is a single-line block diagram of a section of an exemplary utility distribution system.

Referring to FIG. 1, an illustration of one type of system that would benefit from embodiments of the present invention is provided. FIG. 1 is a single-line block diagram of a section of an exemplary utility distribution system such as, for example, an electric distribution system. As shown in FIG. 1, a utility service is delivered by a utility provider 100 to various loads $L_1$-$L_n$ 102 through a distribution system 104. In one aspect, the utility service provided can be electric power. Though shown in FIG. 1 as a single-line diagram, it is to be appreciated that the distribution system 104 can be comprised of single-phase and/or poly-phase components and be of varying voltage levels. Consumption and demand by the loads 102 can be measured at the load locations by revenue meters $M_1$-$M_n$ 106. Meters 106 can be single-phase or poly-phase electric meters, as known to one of ordinary skill in the art, depending upon the load 102. For example, the load can be single-phase and therefore the meter 106 can be single phase. Single-phase loads can be connected to different phases (e.g., phase A, phase B or phase C) of the distribution system 104. Similarly, for example, the load 102 can be a poly-phase load such as a three-phase load and the meter 106 can be a three-phase meter that meters the three phases serving the load 102.

In one aspect, the electric meter 106 is a smart meter as described herein and as known to one of ordinary skill in the art. Hereinafter, the specification will refer to the revenue meter 106 as a "meter," "electric meter," and/or "smart meter," where the terms can be used interchangeably. One non-limiting example of a smart meter is the GE I210+c meter as available from General Electric Company ("GE") (Schenectady, N.Y.). While consumption or demand information is used by the utility provider 100 primarily for billing the consumer, it also can be used for other purposes including planning and profiling the utility distribution system. In some instances, utility providers 100 desire to electronically communicate with the meters 106 for numerous purposes including scheduling disconnection or connection of utility services to the loads 102, automatic meter reading (AMR), load shedding and load control, automatic distribution and smart-grid applications, outage reporting, supplying pricing information, providing additional services such as Internet, video, and audio, etc. As noted above, meters 106 can be configured to measure electrical parameters at the meter 106 location such as voltage, current, power factor, and the like. In many of these instances, the meters 106 can be configured to communicate with one or more computing devices 108 through a communications network 110, which can be wired (including fiber optic), wireless or a combination of wired and wireless, as known to one of ordinary skill in the art. In one aspect, the network 110 is an advanced metering infrastructure (AMI) network. AMI refers to systems that measure, collect and analyze energy usage, and interact with advanced devices such as electricity meters, gas meters, water meters, and the like through various communication media either on request (on-demand) or on pre-defined schedules. This infrastructure includes hardware, software, communications, consumer energy displays and controllers, customer associated systems, meter data management (MDM) software, supplier and network distribution business systems, and the like. The network 110 between the measurement devices (e.g., meters 106) and business systems allows collection and distribution of information to customers, suppliers, utility companies and service providers. This enables these businesses to either participate in, or provide, demand response solutions, products and services. By providing information to customers, the system assists a change in energy usage from their normal consumption patterns, either in response to changes in price or as incentives designed to encourage lower energy usage use at times of peak-demand periods or higher wholesale prices or during periods of low operational systems reliability. In one aspect, the network 110 comprises at least a portion of a smart grid network. In one aspect, the network 110 utilizes one or more of one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, OpenHAN, power line carrier (PLC), broadband over power lines (BPL), and the like.

In some instances, the utility 100 desires to communicate with one or more electrical devices 102 at a metered location. In one aspect, the network 110 can be used by the utility to communicate with the one or more electrical devices 102. For example, a utility may desire to control operational characteristics of loads (e.g. electrical devices) 102 by use of a demand response management system (DRMS). An exemplary DRMS can be implemented through the use of dedicated control systems to shed loads in response to a request by a utility 100 or based upon market price conditions. Services (e.g., lights, machines, air conditioning, etc.) can be reduced according to a preplanned hierarchical load prioritization scheme during the critical time frames. Generally, a DRMS can control or affect the operational characteristics of one or more electrical devices 102 found at a metered location. Such electrical devices can include, for example, one or more of a heating, ventilation and air conditioning (HVAC) unit, a water heater, lighting, a dish washer, a refrigerator, a washing machine, a dryer, an electric stove or oven, a microwave oven, a water pump, and the like. In various instances, the utility 100 can communicate with the electrical devices 102 by use of network 110 that can comprise all or part of a DRMS, an AMI (as described herein), a smart-grid implementation, an Internet connection, or combinations thereof. The network 110 media can be wired (including fiber optic), wireless, or combinations thereof. In various aspects, the utility 100 can adjust operational characteristics of one or more electrical devices 100. For example, adjusting the one or more operational characteristics of the electrical device 102 can comprise cycling the electrical device on and off. Such cycling can occur at a specified frequency. In one aspect, adjusting the one or more operational characteristics of the electrical device 102 comprises preventing the electrical device 102 from operating or being energized for a defined period of time.

In one aspect, the network 110 communicates with a meter 106, such as a smart meter, which in turn communicates either wirelessly or through a wired connection with the one or more electrical devices at the metered location. In one aspect, a radio within the meter 106 communicates wirelessly with one or more devices. In one aspect, the meter 106 communicates with the one or more electrical devices using one or more of a WPAN (e.g., ZigBee, Bluetooth), LAN/WLAN (e.g., 802.11n, microwave, laser, etc.), WMAN (e.g., WiMAX, etc.), WAN/WWAN (e.g., UMTS, GPRS, EDGE, CDMA, GSM, CDPD, Mobitex, HSDPA, HSUPA, 3G, etc.), RS232, USB, Firewire, Ethernet, wireless USB, cellular, OpenHAN, power line carrier (PLC), broadband over power lines (BPL), and the like. In other instances, the network 110 can communicate directly with the one or more electrical devices using, for example, the Internet, cellular telephone, wired telephone connections, wired cable television connections, and the like.

Figure 2:
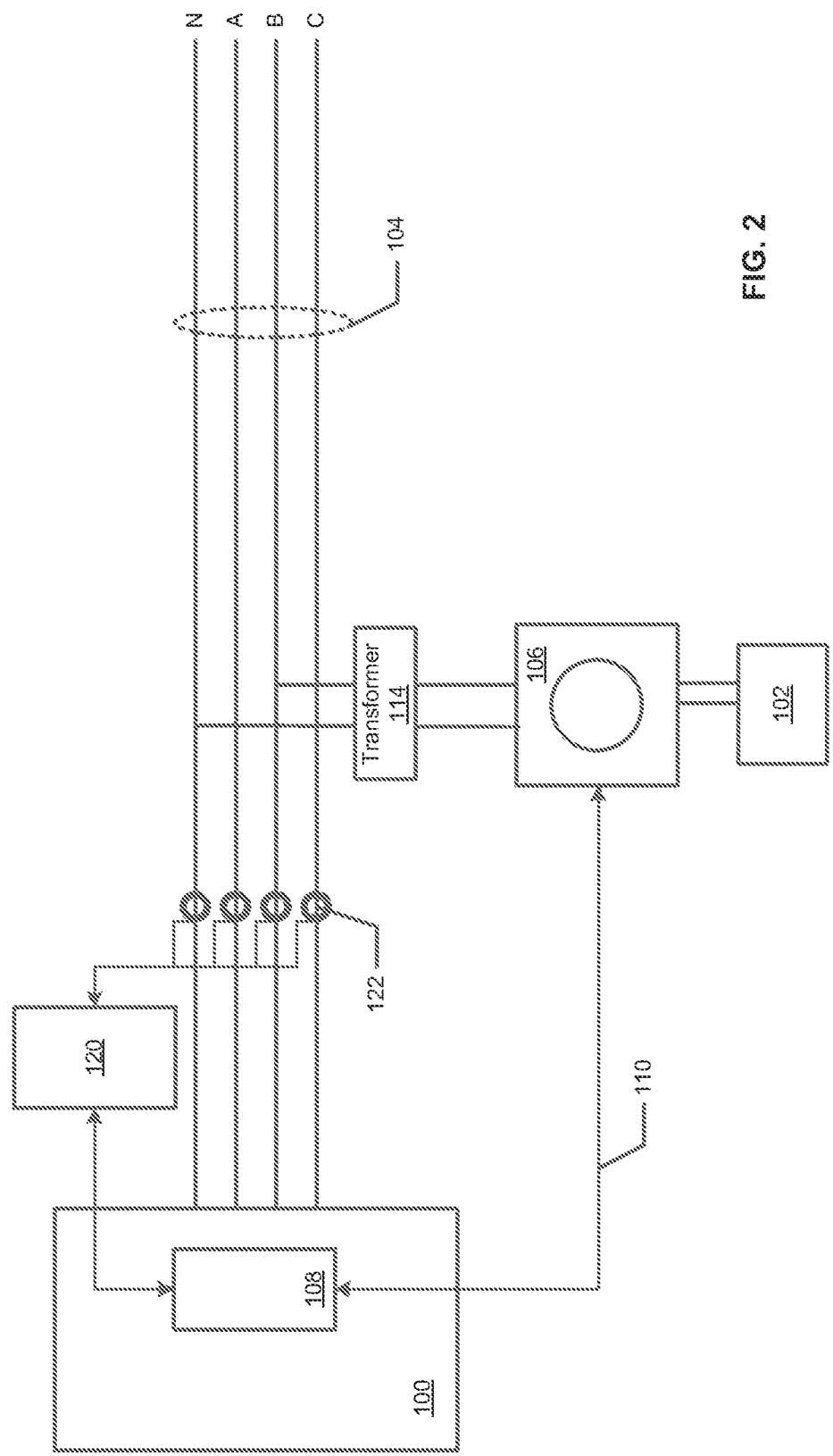
FIG. 2 is an exemplary detailed illustration of a portion of a three-phase, four-wire (phases A, B, C and neutral, N) distribution system according to one embodiment of the present invention.

Referring now to FIG. 2, in some instances an electrical distribution system 104 may be a poly-phase system such as a three-phase, four-wire network, which supplies power-using feeders. Each of the feeder lines then branches into multiple circuits to power a plurality of local pole-mounted or pad-mounted transformers 114, which step the voltage down to final voltages of, for example, 120 or 240 volts phase-to-ground or phase-to-phase for delivery and metering at metered commercial and residential customer locations. Generally, residential customers can be connected to any one phase of the three-phase system using a single-phase meter and commercial customers can be connected to all the three phases using three-phase meter with a load control relay ("LCR") connected on any one of the phases. FIG. 2 is an exemplary detailed illustration of a portion of a three-phase, four-wire (phases A, B, C and neutral, N) distribution system according to one embodiment of the present invention. As shown in FIG. 2, distribution system 104 is comprised of three phase conductors (phases A, B and C) and a neutral (N) wire. In one aspect, each of three phases and the neutral are provided to each meter 106. In one aspect, the voltage provided at the meters 106 is stepped down by a transformer 114 to a level that can be used by the load 102 (e.g. 120/240, 277/480, and the like). The transformer 114 can be a single transformer, two or three single-phase transformers, or a single three-phase transformer, as needed to serve the load. FIG. 2 illustrates a single-phase load 102 served from phase B of the three-phase distribution system 104, though it is to be understood that embodiments of the present invention are equally applicable to poly-phase loads (and meters). As shown in FIG. 2, computing device 108 interfaces with meter 106 through network 110. For example, computing device 108 can communicate with meter 106 to cause meter 106 to adjust the operational characteristics of electrical device 102. As noted above, adjusting the one or more operational characteristics of the electrical device 102 can comprise cycling the electrical device on and off wherein such cycling can occur at a specified frequency, or preventing the electrical device 102 from operating. Network 110 can comprise DRMS, an AMI, the Internet, combinations thereof and the like. In various aspects, the network can be comprised of wired (including fiber optic) or wireless components, or combinations thereof.

Further comprising the system shown in FIG. 2 is a monitoring system 120. Monitoring system 120 is comprised of at least one or more sensors 122, wherein the sensors 122 are configured to and capable of detecting a change in at least one electrical parameter of one or more phases of a poly-phase electrical system 104 that provides electrical energy to the electrical device 102. In one aspect, monitoring system 120 comprises all or a portion of a supervisory control and data acquisition (SCADA) system. In another aspect, monitoring system 120 comprises all or a portion of a distribution management system (DMS). In another aspect, monitoring system 120 is a combination of all or portions of a SCADA system and a DMS. In one aspect, monitoring system 120 has a separate computing device (e.g., a SCADA processor); while in other aspects monitoring system 120 makes use of computing device 108 (which can serve as a SCADA processor). Monitoring system 120 can detect changes in at least one electrical parameter of one or more phases of a poly-phase electrical system 104 that provides electrical energy to the electrical device 102. In various aspects, sensors 122 can detect changes in at least one of voltage, current, resistance, frequency, capacitance, inductance, power factor, real power, reactive power and the like of the one or more phases of the poly-phase electrical system 104 that provides electrical energy to the electrical device 102. In one aspect, monitoring system 120 can further analyze signals received from the sensors 122. For example, in one instance the monitoring system 120 can perform a fast-Fourier transform (FFT) of the sensor signals to detect the affected electrical parameters. In one aspect, such analysis can be performed on a processor such as SCADA processor or computing device 108 described herein. In other aspects, monitoring system 120 can perform other frequency- or time-domain analyses on the sensor signals.

Computing device 108 can receive from monitoring system 120 information about changes in at least one electrical parameter of one or more phases of the poly-phase electrical system 104. For example, the monitoring system 108 can detect changes in the power factor of the electrical system 104 at or proximate to the location of the sensors 122. In response to the detected changes in one or more electrical parameters, computing device 108 can send a signal to the meter 106 through network 110 that can cause a change in the operational characteristics of at least one of the one or more electrical apparatus 102.

Figure 3:
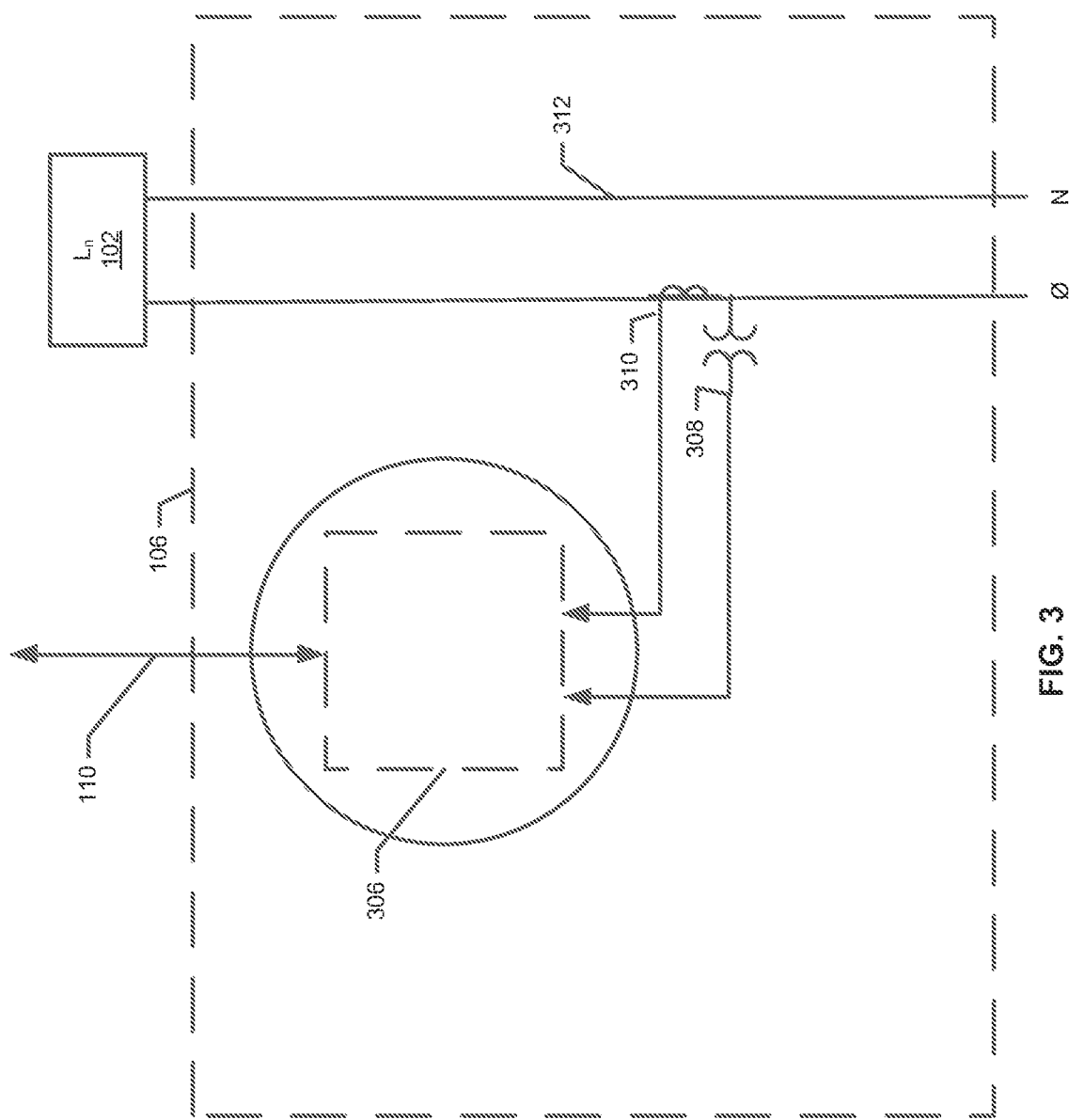
FIG. 3 illustrates an overview block diagram of a non-limiting embodiment of a meter that can be used to practice embodiments of the present invention.

FIG. 3 illustrates an overview block diagram of a non-limiting embodiment of a meter 106 that can be used to practice embodiments of the present invention. In this exemplary embodiment, the utility service is single-phase electric power comprised of at least one phase conductor and a neutral conductor 312, though it is to be appreciated that the embodiments of the invention can be used with single- and poly-phase electrical systems such as two-phase, three-phase, four-phase, etc. Further comprising the embodiment of a meter 106 shown in FIG. 3 are meter's electronics 306. Analog voltage and current inputs are provided to meter electronics 306. In one aspect, the analog signals are derived from the electrical power feed serving the load 102 and the one being metered by the meter 106. In another aspect, the analog signals are derived from a separate electrical source. In one aspect, the analog voltage signal can be provided by one or more potential transformers (PT) 308, if needed, though other means such as a voltage divider, capacitive coupling, or the like can be used. If the voltage level of the source is sufficiently low (e.g., 0.25 volts AC, or lower), then a PT 308 or other means of stepping down or transforming the voltage can be omitted. Similarly, in one aspect, the analog current signal can be provided by one or more current transformers (CT) 310. In one aspect, the one or more CTs 310 can have a turns ratio of 1:2500. In one aspect, one or more resistors (not shown) can be used to convert the current signal from the CT 310 into a voltage signal.

In one aspect, the meter electronics 306 can comprise a memory (not shown in FIG. 3). The memory can be used to store data such as, for example, information about the electrical energy consumption of the load 102. Such information, or part of it, can be transmitted from the meter 106 to the computing device 108 over the network 110. In one aspect, the network 110 is an advanced metering infrastructure (AMI) network as described herein.

Figure 4:
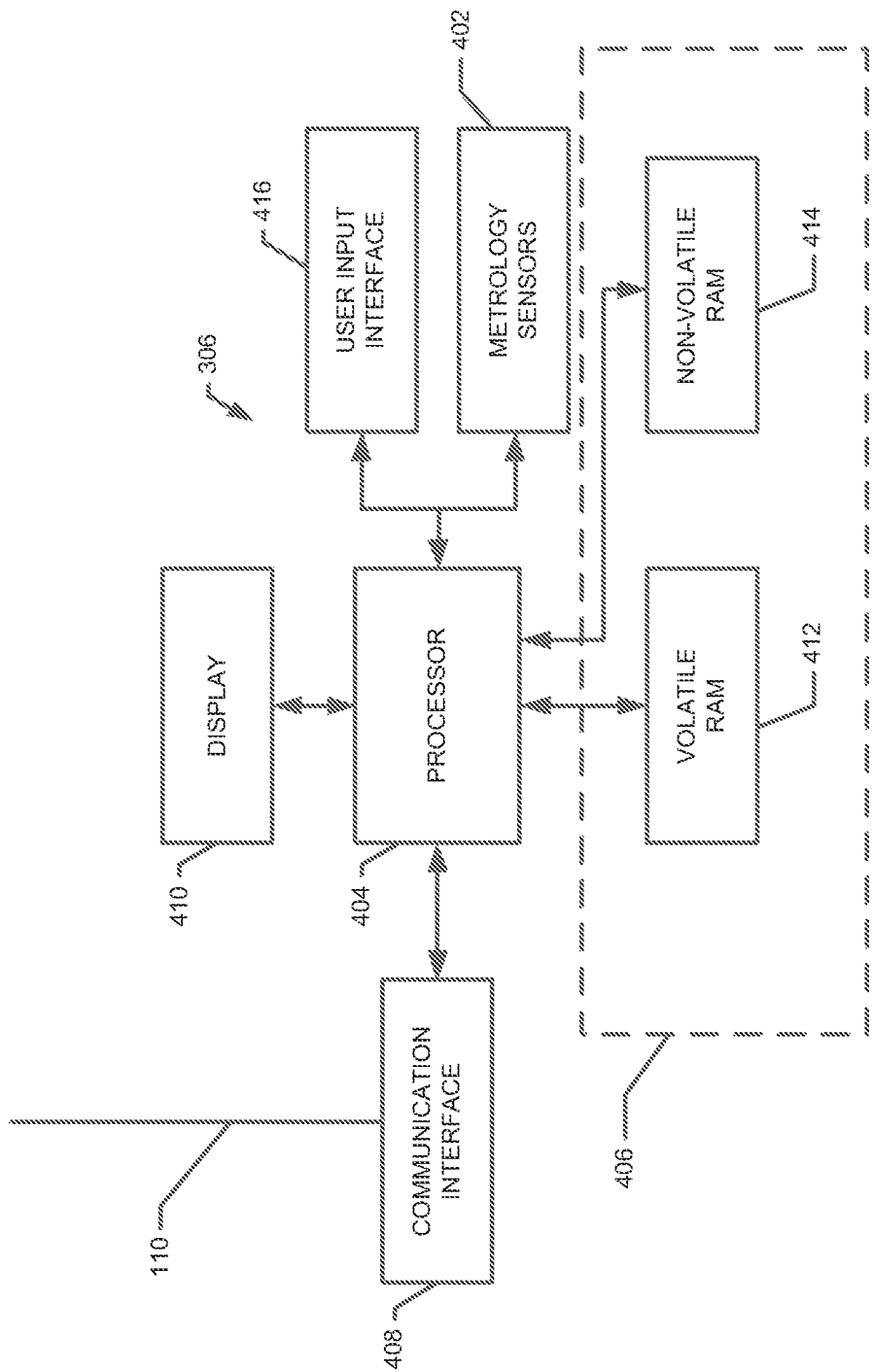
FIG. 4 illustrates a block diagram of an entity capable of operating as meter electronics in accordance with one embodiment of the present invention.

Referring now to FIG. 4, a block diagram of an entity capable of operating as meter electronics 306 is shown in accordance with one embodiment of the present invention. The entity capable of operating as meter electronics 306 includes various means for performing one or more functions in accordance with embodiments of the present invention, including those more particularly shown and described herein. It should be understood, however, that one or more of the entities may include alternative means for performing one or more like functions, without departing from the spirit and scope of the present invention. As shown, the entity capable of operating as meter electronics 306 can generally include means, such as one or more processors 404 for performing or controlling the various functions of the entity. As shown in FIG. 4, in one embodiment, meter electronics 306 can comprise metering components such as metrology sensors 402, which include meter inputs and filtering components. Metrology sensors can be, for example, current transformers, shunts, Rogowski coils, Hall-effect sensors and the like. In one aspect, the meter inputs and filter components can comprise voltage and current inputs, one or more ADCs, filtering components, and the like. Further comprising this embodiment of meter electronics 306 are one or more processors 404 and memory 406.

In one embodiment, the one or more processors 404 are in communication with or include memory 406, such as volatile and/or non-volatile memory that stores content, data or the like. For example, the memory 406 may store content transmitted from, and/or received by, the entity. Also for example, the memory 406 may store software applications, instructions or the like for the one or more processors 404 to perform steps associated with operation of the entity in accordance with embodiments of the present invention. In one aspect, the meter's electronics 306 can comprise one or more metering micro-controllers including a Teridian 6533 controller or a Teridian 6521 controller as are available from Maxim Integrated Products, Inc. (Sunnyvale, Calif.), among others. In one aspect, the one or more processors 404 can perform metering functions such as determining the number of kilowatt-hours (KWH) of electricity consumed by the load 102, kilovolt-amp reactive hours (kVARh), power factor, and the like.

In one aspect, memory 406 can be comprised of a volatile memory 412, such as a dynamic random access memory (DRAM), static random access memory (SRAM), and the like; and non-volatile random access memory (NVRAM) 414. Generally, volatile memory 412 such as DRAM stores each bit of data in a separate capacitor within an integrated circuit. The capacitor can be either charged or discharged; these two states are taken to represent the two values of a bit, conventionally called 0 and 1. Since capacitors leak charge, the information eventually fades unless the capacitor charge is refreshed periodically. Because of this refresh requirement, it is a dynamic memory as opposed to SRAM and other static memory. In various aspects, DRAM can comprise any of the families of double data rate synchronous dynamic random access memory (DDR SDRAM). Generally, NVRAM is random-access memory that retains its information when power is turned off, which is described technically as being non-volatile. In one aspect, the NVRAM 414 comprises electrically erasable programmable read-only memory (EEPROM). In another aspect, the NVRAM 414 is flash memory. As shown in FIG. 4, the processor 404 can receive metrology data from one or more metrology sensors 402. At least a part of the metrology data received by the processor 404 can be written to the volatile memory buffer 412. A write pointer (not shown) that is associated with the volatile memory 412 can be incremented to indicate where to store the metrology data within the volatile memory buffer 412. The above steps of receiving metrology data, writing at least part of it to the volatile memory 412, and incrementing the write pointer can be repeated until a timer expires. In one aspect, the timer can be included within the processor 404. In another aspect, the timer can be a separate circuit (not shown) that is operably connected to the processor 404. In one aspect, a single timer circuit can be used to control multiple processors. The timer can be programmed or set for any amount of time as desired, for example, the timer can be set at 0.01 seconds, 0.1 seconds, 1 second, 30 seconds, 1 minute, 5 minutes, etc., and any time period therebetween. In one aspect, the timer expires before the volatile memory buffer 412 is full. In another aspect, the timer may not expire until after the volatile memory buffer 412 is full, but the volatile memory buffer 412 is not emptied until the timer expires. When the timer expires, the write pointer of the volatile memory 412 is set as a read pointer and the processor 404 reads the metrology data that has been stored in the volatile memory 412 from the volatile memory buffer 412 up to an amount of metrology data as indicated by the read pointer. The metrology data that is read from the volatile memory 412 can be written by the processor 404 to the non-volatile random access memory (NVRAM) 414, or it can be transmitted over a network 110 using a communication interface 408. In one aspect, metrology data that is read from the volatile memory 412 can be written to a storage location on the processor 404 and then written by the processor 404 to the non-volatile random access memory (NVRAM) 414. In one aspect, the processor 404 can read at least a portion of the metrology data from the NVRAM 414 and transmit the read metrology data over the network 110 using a network interface 408. In one aspect, transmitting the read metrology data over the network 110 using the network interface 408 comprises the processor first receiving a request for at least a portion of the metrology data over the network 110 and transmitting the read metrology data over the network 110 using the network interface 408 in response to the request. In one aspect, the network 110 comprises at least a portion of an advanced metering infrastructure (AMI) network.

In addition to the memory 406, the one or more processors 404 can also be connected to at least one interface or other means for displaying, transmitting and/or receiving data, content or the like. In this regard, the interface(s) can include at least one communication interface 408 or other means for transmitting and/or receiving data, content or the like, as well as at least one user interface that can include a display 410 and/or a user input interface 416. In one aspect, the communication interface 408 can be used to transfer information stored in the memory 406 to a remote computing device 108 such as the one described herein over a network 110, or to receive a signal from the remote computing device 108. In one aspect, the network 110 is an advanced metering infrastructure (AMI) network. In one aspect, the communication interface 408 can further comprise a wireless communication interface such as a Wi-Fi transceiver or radio that can be used to communicate with electrical apparatus 102 at or proximate to the meter's 106 location. Likewise, the communication interface 408 can further comprise a wired communication interface that can be used to communicate with electrical apparatus 102 through a wired (or fiber optic) connection, including broadband over power line (BPL) or power line carrier (PLC). The user input interface 416, in turn, can comprise any of a number of devices allowing the entity to receive data from a user, such as a keypad, a touch display, a joystick or other input device.

Figure 5:
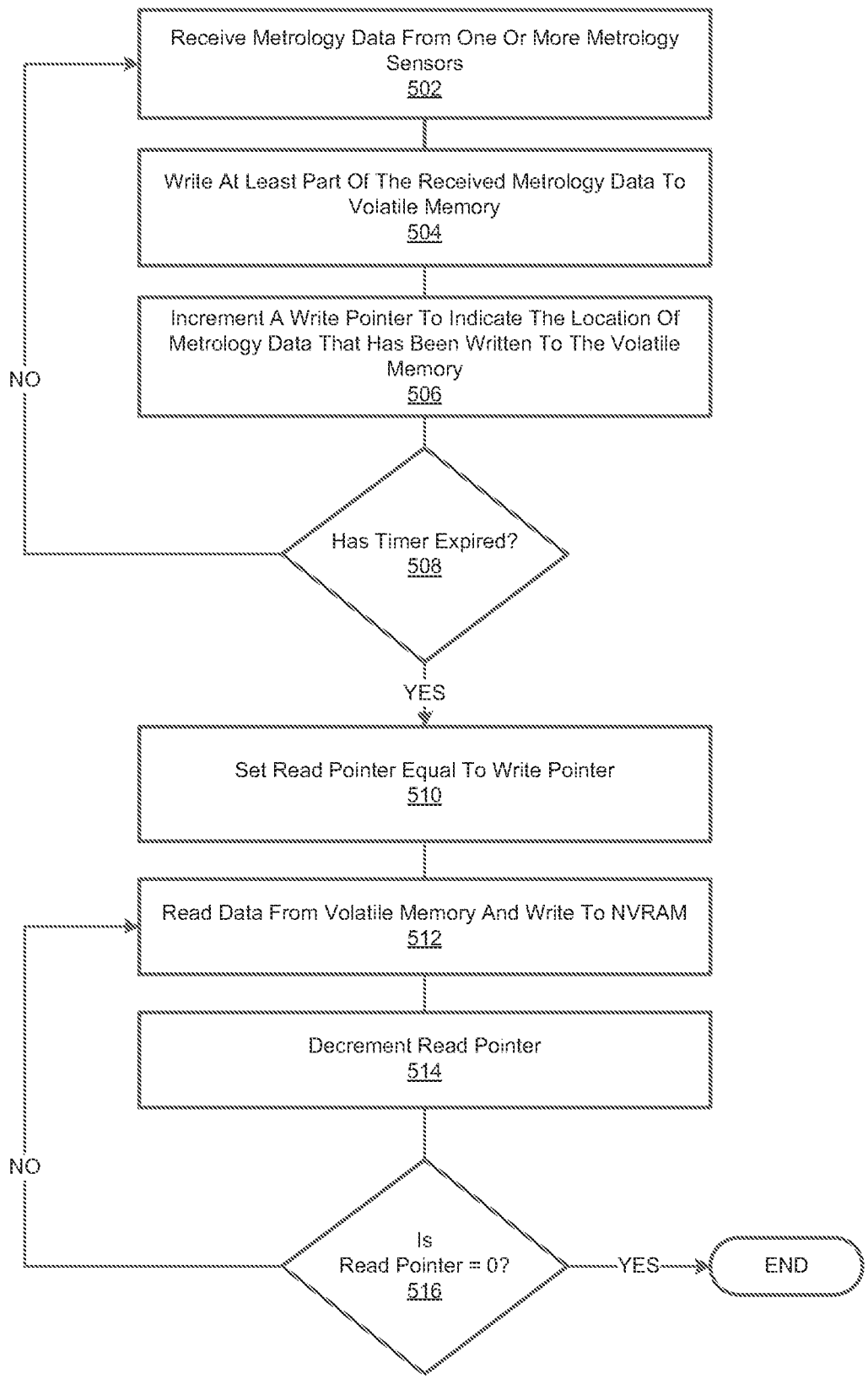
FIG. 5 is a flowchart illustrating the operations that may be taken for using a timer-based buffer for metrology data. according to an embodiment of the present invention.

Referring now to FIG. 5, the operations are illustrated that may be taken for using a timer-based buffer for metrology data. At Step 502, metrology data is received from one or more sensors. Such data can be, for example, data related to current, voltage, power factor, kilo-watts, kilo-watt hours (kWH), kWH demand, kilo-volt amperes reactive (kVAR), kVAR hours, kVAR demand, load control, time of use, and the like. The metrology sensors can be, for example, current transformers, shunts, Rogowski coils, Hall-effect sensors and the like. At Step 504, at least a portion of the received metrology data is written to volatile memory such as, for example, a DRAM buffer. In one aspect, writing at least part of the metrology data to the volatile memory comprises writing at least a portion of the metrology data to a double data rate synchronous dynamic random access memory (DDR SDRAM). At Step 506, a write pointer is incremented to show the location of data that is contained within the volatile memory. The write pointer can be, for example, one or a range of addresses where the metrology data has been stored on the volatile memory. At step 508, it is determined whether a timer expired. For example, the timer may have begun running when the metrology data was first received (Step 502), or it may have begun running before or after that event. The timer is set to run for a defined time period before it expires. The defined time period can be any period of time desired. If, at Step 508, the timer has not expired, then the process returns to Step 502 where more metrology data can be received from the one or more metrology sensors. The timer continues to run. If, at Step 508, the timer has expired, then the process continues to Step 510. At Step 510, a read pointer is set that is equal to the write pointer. At Step 512, metrology data stored on the volatile memory is read from the volatile memory. In one aspect, the metrology data read form the volatile memory is written to a non-volatile random access memory (NVRAM). In one aspect, writing the metrology data read from the volatile memory to the NVRAM comprises writing the metrology data read from the volatile memory to an electrically erasable programmable read-only memory (EEPROM). In another aspect, the NVRAM is flash memory. At Step 514, the read pointer is decremented in accordance with the data read from the volatile memory in step 512. At step 516, it is determined whether the volatile memory is empty (i.e., whether the read pointer is zero). If not, then the process goes to step 512, and additional data is read from the volatile memory. If, at Step 516, the volatile memory is empty, then the process ends. In one aspect, the process can further include reading at least a portion of the metrology data from the NVRAM and transmitting the read metrology data over a network using a network interface. In one aspect, transmitting the read metrology data over the network using the network interface comprises receiving a request for at least a portion of the metrology data over the network and transmitting the read metrology data over the network using the network interface in response to the request. In one aspect, the network can be an AMI network.

The above system has been described above as comprised of units. One skilled in the art will appreciate that this is a functional description and that software, hardware, or a combination of software and hardware can perform the respective functions. A unit, such as an electrical device, a meter, a smart grid, a utility computing device, a network, a vendor or manufacturer's computing device, etc., can be software, hardware, or a combination of software and hardware. In one exemplary aspect, the units can comprise a computing device 108 as referenced above and further described below.

Figure 6:
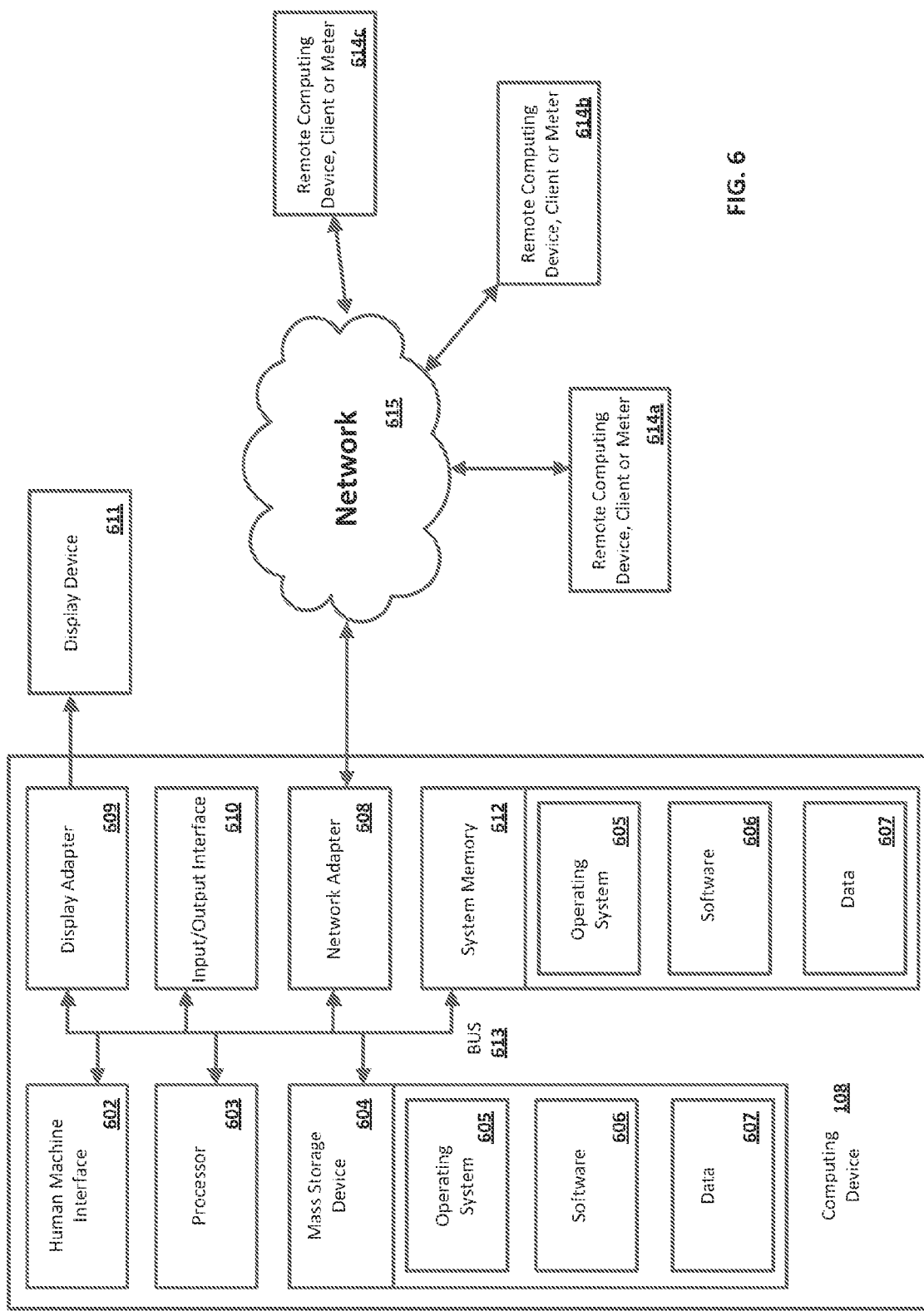
FIG. 6 is a block diagram illustrating an exemplary operating environment for performing operations associated with the disclosed methods.

FIG. 6 is a block diagram illustrating an exemplary operating environment for performing operations associated with the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, smart meters, smart-grid components, SCADA masters, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that aspects of the systems and methods disclosed herein can be implemented via a computing device 108. The components of the computing device 108 can comprise, but are not limited to, one or more processors or processing units 603, a system memory 612, and a system bus 613 that couples various system components including the processor 603 to the system memory 612. In the case of multiple processing units 603, the system can utilize parallel computing. In one aspect, the processor 603 is configured to receive metrology data over a network 110 from one or meters 106.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 613, and all buses specified in this description can also be implemented over a wired or wireless network connection and each of the subsystems, including the processor 603, a mass storage device 604, an operating system 605, software 606, data 607, a network adapter 608, system memory 612, an Input/Output Interface 610, a display adapter 609, a display device 611, and a human machine interface 602, can be contained within one or more remote computing devices, clients, or smart meters 614a,b,c at physically separate locations, connected through buses of this form, in effect implementing a fully distributed system or distributed architecture.

The computing device 108 typically comprises a variety of computer readable media. Exemplary readable media can be any available media that is non-transitory and accessible by the computing device 108 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data 607 such as metrology data and/or program modules such as operating system 605 and software 606 that are immediately accessible to and/or are presently operated on by the processing unit 603. In one aspect, the system memory 612 contains computer executable codes sections for performing the steps of receiving metrology data from one or more meters 106 and processing the data as desired.

In another aspect, the computing device 108 can also comprise other non-transitory, removable/non-removable, volatile/non-volatile computer storage media. By way of example, FIG. 6 illustrates a mass storage device 604 that can provide non-volatile storage of computer code, computer readable instructions, data structures, program modules, and other data for the computing device 108. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and software 606. Each of the operating system 605 and software 606 (or some combination thereof) can comprise elements of the programming and the software 606. Data 607 can also be stored on the mass storage device 604. Data 607 can be stored in any of one or more databases known in the art. Examples of such databases comprise, DB2®, (IBM Corporation, Armonk, N.Y.), Microsoft® Access, Microsoft® SQL Server, (Microsoft Corporation, Bellevue, Wash.), Oracle®, (Oracle Corporation, Redwood Shores, Calif.), mySQL, PostgreSQL, and the like. The databases can be centralized or distributed across multiple systems.

In another aspect, the user can enter commands and information into the computing device 108 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computing device 108 can have more than one display adapter 609 and the computing device 108 can have more than one display device 611. For example, a display device can be a monitor, an LCD (Liquid Crystal Display), or a projector. In addition to the display device 611, other output peripheral devices can comprise components such as speakers (not shown) and a printer (not shown), which can be connected to the computer 108 via input/output interface 610. Any step and/or result of the methods can be output in any form to an output device. Such output can be any form of visual representation, including, but not limited to, textual, graphical, animation, audio, tactile, and the like.

The computing device 108 can operate in a networked environment using logical connections to one or more remote computing devices, clients or smart meters 614a,b,c. By way of example, a remote computing device 614 can be a personal computer, portable computer, a server, a router, a network computer, a smart meter, a vendor or manufacture's computing device, smart grid components, a SCADA master, a DRMS processor, a DMS processor, a peer device or other common network node, and so on. Logical connections between the computing device 108 and a remote computing device or client 614a,b,c can be made via a local area network (LAN) and a general wide area network (WAN). Such network connections can be through a network adapter 608. A network adapter 608 can be implemented in both wired and wireless environments. Such networking environments are conventional and commonplace in offices, enterprise-wide computer networks, intranets, and other networks 615 such as the Internet or an AMI network.

For purposes of illustration, application programs and other executable program components such as the operating system 605 are illustrated herein as discrete blocks, although it is recognized that such programs and components reside at various times in different storage components of the computing device 108, and are executed by the data processor(s) of the computer. An implementation of software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

As described above and as will be appreciated by one skilled in the art, embodiments of the present invention may be configured as a system, method, or computer program product. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable non-transitory computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as the one or more processors 603 discussed above with reference to FIG. 6 or the one or more processors 404 of FIG. 4, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., one or more processors 603 of FIG. 6 or the one or more processors 404 of FIG. 4) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   a. receiving metrology data from one or more metrology sensors, wherein the one or more metrology sensors are configured to detect changes in a parameter of received electrical energy;
   b. writing at least part of the metrology data to a volatile memory;
   c. incrementing a write pointer to indicate where to store the metrology data within the volatile memory; and
   d. repeating steps a through c until a timer expires, then reading at least a portion of the metrology data from the volatile memory.

2. The method of claim 1, wherein the write pointer is set as a read pointer and the metrology data is read from the volatile memory up to an amount of metrology data as indicated by the read pointer.

3. The method of claim 1, wherein at least the portion of the metrology data read from the volatile memory is written to a non-volatile random access memory (NVRAM).

4. The method of claim 3, wherein writing at least a portion of the metrology data to the NVRAM comprises writing at least the portion of the metrology data to an electrically erasable programmable read-only memory (EEPROM) or a flash memory.

5. The method of claim 1, further comprising transmitting at least a portion of the metrology data over a network using a network interface.

6. The method of claim 5, wherein transmitting the read metrology data over the network using the network interface comprises receiving a request for at least a portion of the metrology data over the network and transmitting the read metrology data over the network using the network interface in response to the request.

7. The method of claim 5, wherein transmitting the read metrology data over the network using the network interface comprises transmitting the read metrology data over an advanced metering infrastructure (AMI) network using the network interface.

8. The method of claim 1, wherein writing at least part of the metrology data to the volatile memory comprises writing at least a portion of the metrology data to a double data rate synchronous dynamic random access memory (DDR SDRAM).

9. The method of claim 1, wherein the timer expires before the volatile memory is full.

10. A system comprised of:
one or more metrology sensors, wherein the one or more metrology sensors are configured to detect changes in a parameter of received electrical energy;
a volatile memory;
a non-volatile random access memory (NVRAM);
a timer; and
a processor, wherein the processor is operably connected with the one or more metrology sensors, the volatile memory, the NVRAM and the timer, and the processor is configured to:
  a. receive metrology data from the one or more metrology sensors;
  b. write at least part of the metrology data to the volatile memory;
  c. increment a write pointer indicating where to store the metrology data within the volatile memory; and
  d. repeat steps a through c until the timer expires, then reading at least a portion of the metrology data from the volatile memory.

11. The system of claim 10, wherein the processor is configured to set the write pointer as a read pointer and reading the metrology data from the volatile memory up to an amount of metrology data as indicated by the read pointer.

12. The system of claim 10, wherein the processor is configured to write at least the portion of the metrology data read from the volatile memory to the NVRAM.

13. The system of claim 12, wherein the NVRAM comprises an electrically erasable programmable read-only memory (EEPROM) or a flash memory.

14. The system of claim 10, further comprising a network interface and a network wherein the processor is configured to transmit at least a portion of the metrology data over the network using the network interface.

15. The system of claim 14, wherein the processor configured to transmit at least the portion of the metrology data over the network using the network interface comprises the processor receiving a request for at least the portion of the metrology data over the network and transmitting the metrology data over the network using the network interface in response to the request.

16. The system of claim 14, wherein the processor configured to transmit at least the portion of the metrology data over the network using the network interface comprises the processor configured to transmit at least the portion of metrology data over an advanced metering infrastructure (AMI) network using the network interface.

17. The system of claim 10, wherein the processor configured to write at least part of the metrology data to the volatile memory comprises the processor configured to write at least a portion of the metrology data to a double data rate synchronous dynamic random access memory (DDR SDRAM).

18. The system of claim 10, wherein the timer expires before the volatile memory buffer is full.

19. A meter comprised of:
one or more metrology sensors, wherein the one or more metrology sensors are configured to detect changes in a parameter of received electrical energy;
a dynamic random access memory (DRAM);
a non-volatile random access memory (NVRAM);
a timer;
a network interface; and
a processor, wherein the processor is operably connected with the one or more metrology sensors, the DRAM, the NVRAM, the network interface, and the timer, and the processor is configured to:
  a. receive metrology data from the one or more metrology sensors;
  b. write at least part of the metrology data to the DRAM;
  c. increment a write pointer indicating where to store the metrology data within the DRAM; and
  d. repeat steps a through c until the timer expires, then set the write pointer as a read pointer and reading at least a portion of the metrology data from the DRAM up to an amount of metrology data as indicated by the read pointer and write at least the portion of the metrology data read from the DRAM to the NVRAM.

20. The meter of claim 19, wherein the NVRAM comprises an electrically erasable programmable read-only memory (EEPROM) or a flash memory.

21. The meter of claim 19, wherein the processor is configured to transmit at least a portion of the metrology data over a network using the network interface.

22. The meter of claim 21, wherein the network is an advanced metering infrastructure (AMI) network.

23. The meter of claim 19, wherein the DRAM is a double data rate synchronous dynamic random access memory (DDR SDRAM).

* * * * *